United States Patent
Shami et al.

(10) Patent No.: US 10,106,168 B2
(45) Date of Patent: Oct. 23, 2018

(54) METHODS AND SYSTEMS FOR PROACTIVELY ESTIMATING ROAD SURFACE FRICTION COEFFICIENT

(71) Applicant: GM GLOBAL TECHNOLOGY OPERATIONS LLC, Detroit, MI (US)

(72) Inventors: Constandi J. Shami, Ann Arbor, MI (US); Christopher J. Twarog, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/443,975

(22) Filed: Feb. 27, 2017

(65) Prior Publication Data

US 2018/0244278 A1     Aug. 30, 2018

(51) Int. Cl.
*B60W 40/06* (2012.01)
*B60W 40/068* (2012.01)
*G05D 1/00* (2006.01)

(52) U.S. Cl.
CPC ......... *B60W 40/068* (2013.01); *G05D 1/0088* (2013.01); *B60W 2550/148* (2013.01)

(58) Field of Classification Search
CPC .......... B60W 40/068; B60W 2550/148; G05D 1/0088
See application file for complete search history.

(56) References Cited

U.S. PATENT DOCUMENTS

| | | | |
|---|---|---|---|
| 2015/0154864 A1* | 6/2015 | Hainzlmaier | G08G 1/09626 340/905 |
| 2016/0059851 A1* | 3/2016 | Klier | B60W 30/02 701/70 |
| 2016/0133131 A1* | 5/2016 | Grimm | B60W 40/068 701/117 |
| 2017/0176196 A1* | 6/2017 | Powers | G01C 21/3415 |
| 2017/0357669 A1* | 12/2017 | Offenhaeuser | G06F 17/30241 |

\* cited by examiner

*Primary Examiner* — Richard M Camby
(74) *Attorney, Agent, or Firm* — Lorenz & Kopf, LLP (57) ABSTRACT

Systems and method are provided for controlling a vehicle. In one embodiment, a method includes: Systems and method are provided for controlling a first vehicle. In one embodiment, a method of determining road surface information for a first vehicle at a vehicle location includes: obtaining a first value of a friction coefficient for a road surface; obtaining environmental data at the vehicle location; calculating a second value of the friction coefficient based on the first value and based on the environmental data at the vehicle location; and controlling the first vehicle based on the second value.

17 Claims, 4 Drawing Sheets

METHODS AND SYSTEMS FOR PROACTIVELY ESTIMATING ROAD SURFACE FRICTION COEFFICIENT

TECHNICAL FIELD

The present disclosure generally relates to autonomous vehicles, and more particularly relates to systems and methods for surface friction coefficient prediction in an autonomous vehicle.

INTRODUCTION

An autonomous vehicle is a vehicle that is capable of sensing its environment and navigating with little or no user input. An autonomous vehicle senses its environment using sensing devices such as RADAR, LIDAR, image sensors, and the like. The autonomous vehicle further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Some of the vehicle automation relies on estimates of a road surface friction coefficient ($\mu$). The road surface friction coefficient impacts vehicle performance by influencing tire grip on the road surface. Having low tire grip (i.e., low surface friction coefficient) results in low vehicle acceleration capabilities, while having higher tire grip (i.e., high surface friction coefficient) results in higher vehicle acceleration capabilities. For example, icy conditions may have a relatively low $\mu$ associated with a lower tire grip and low maximum acceleration, while dry asphalt surfaces may have a relatively high $\mu$ associated with a higher tire grip and higher maximum acceleration.

One method of estimating the road surface friction coefficient is to calculate the self-aligning torque (SAT) of the vehicle's tires, and estimate $\mu$ based on the calculated self-aligning torque (SAT). Estimating $\mu$ based on SAT, however, is reactive in nature and may only be determined for road surfaces on which the vehicle is already operating.

Accordingly, it is desirable to provide systems and methods that proactively estimate a road surface friction coefficient. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a method of determining road surface information for a first vehicle at a vehicle location includes: obtaining a first value of a friction coefficient for a road surface; obtaining environmental data at the vehicle location; calculating a second value of the friction coefficient based on the first value and based on the environmental data at the vehicle location; and controlling the first vehicle based on the second value.

In some embodiments, obtaining environmental data includes measuring an acceleration of a second vehicle using a sensor system at the first vehicle. In some embodiments, calculating the second value includes estimating a minimum road surface friction value based on the acceleration of the second vehicle. In some embodiments, the method further includes transmitting the second value to a communication network that is external to the first vehicle for a subsequent vehicle to use as the first value. In some embodiments, controlling the first vehicle includes planning a path for autonomous driving. In some embodiments, obtaining environmental data includes retrieving a weather report at the vehicle location using a communication network. In some embodiments, obtaining the first value includes retrieving the first value from a communication network based on the vehicle location. In some embodiments, obtaining environmental data includes measuring an outside ambient temperature. In some embodiments, obtaining environmental data includes inferring whether precipitation is present based on a status of a windshield wiper system or based on a rain sensor.

In one embodiment, a system for controlling a vehicle includes an initial friction coefficient module, an environmental data module, and a coefficient adjustment module. The initial friction coefficient module is configured to obtain a first value of a friction coefficient for a road surface. The environmental data module is configured to obtain environmental data at a location. The coefficient adjustment module is configured to calculate a second value of the friction coefficient based on the first value and based on the environmental data at the location.

In some embodiments, the system further includes a vehicle control module configured to control the vehicle based on the second value. In some embodiments, the vehicle control module is further configured to control the vehicle by planning a path for autonomous driving of the vehicle based on the second value. In some embodiments, the environmental data module is configured to obtain the environmental data at least in part by measuring an acceleration of a second vehicle using a sensor system at the vehicle. In some embodiments, the coefficient adjustment module is further configured to calculate the second value based at least in part on estimating a minimum road surface friction value using the acceleration of the second vehicle. In some embodiments, the coefficient adjustment module is further configured to transmit the second value to a communication network that is external to the vehicle for a subsequent vehicle to use as the first value. In some embodiments, the environmental data module is configured to obtain the environmental data at least in part by retrieving a weather report at the location using a communication network. In some embodiments, the initial friction coefficient module is configured to obtain the first value by retrieving the first value from a communication network based on the location.

In one embodiment, an autonomous vehicle includes a sensor system and a control system. The sensor system is configured to collect environmental data external to the autonomous vehicle. The control system includes: an initial friction coefficient module configured to obtain a first value of a friction coefficient for a road surface; a coefficient adjustment module configured to calculate a second value of the friction coefficient based on the first value and based on the environmental data; and a vehicle control module configured to control the autonomous vehicle by planning a path for autonomous driving of the autonomous vehicle based on the second value.

In some embodiments, the coefficient adjustment module is further configured to calculate the second value based at least in part on estimating a minimum road surface friction value using an acceleration of a second vehicle. In some embodiments, the coefficient adjustment module is further configured to transmit the second value to a communication network that is external to the autonomous vehicle for a subsequent vehicle to use as the first value.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
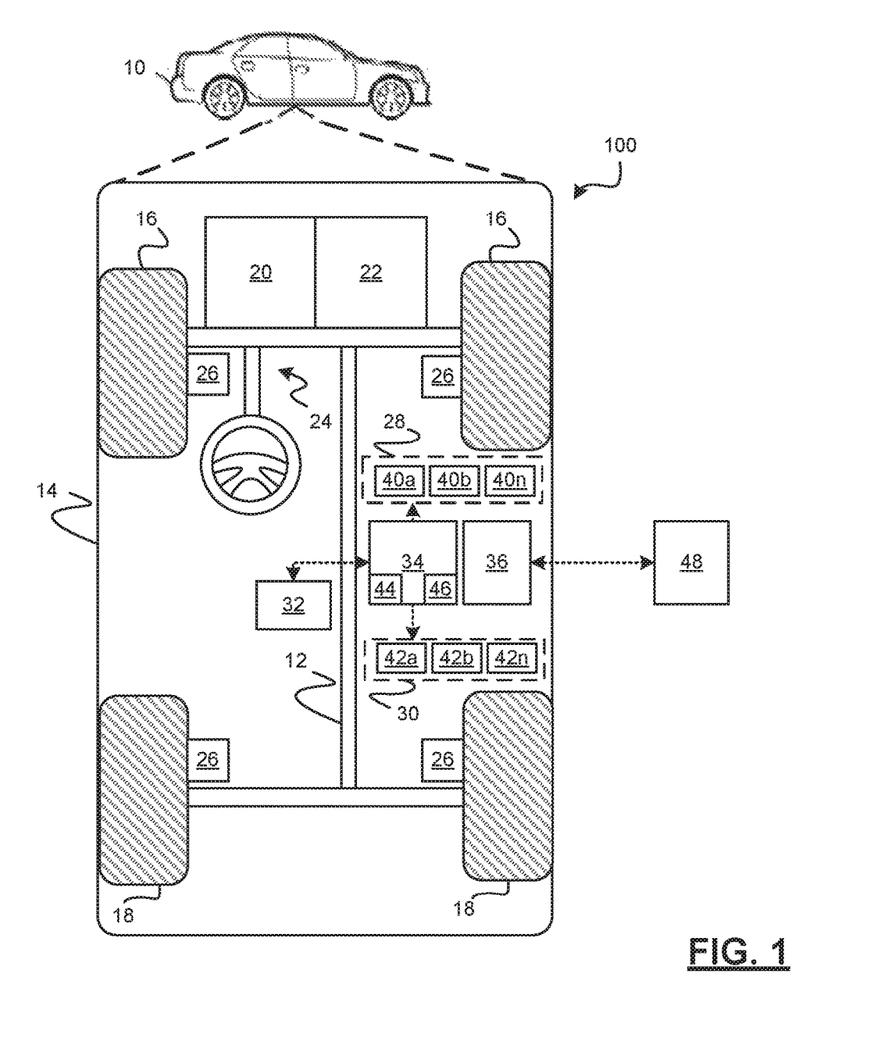
FIG. 1 is a functional block diagram illustrating an autonomous vehicle having a control system, in accordance with various embodiments.

With reference to FIG. 1, a control system shown generally at 100 is associated with a vehicle 10 in accordance with various embodiments. In general, the control system 100 predicts a friction coefficient (μ) of a road surface and operates the vehicle 10 based on the estimated μ.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, RADARs, LIDARs, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the control system 100 and, when executed by the processor 44, predict the road surface friction coefficient $\mu$. For example, the instructions may approximate surface $\mu$ based on sensor input and real-time weather data to adjust path planning, calculate safe stopping distances, predict evasive maneuver capability, and change chassis controls systems proactively.

Figure 2:
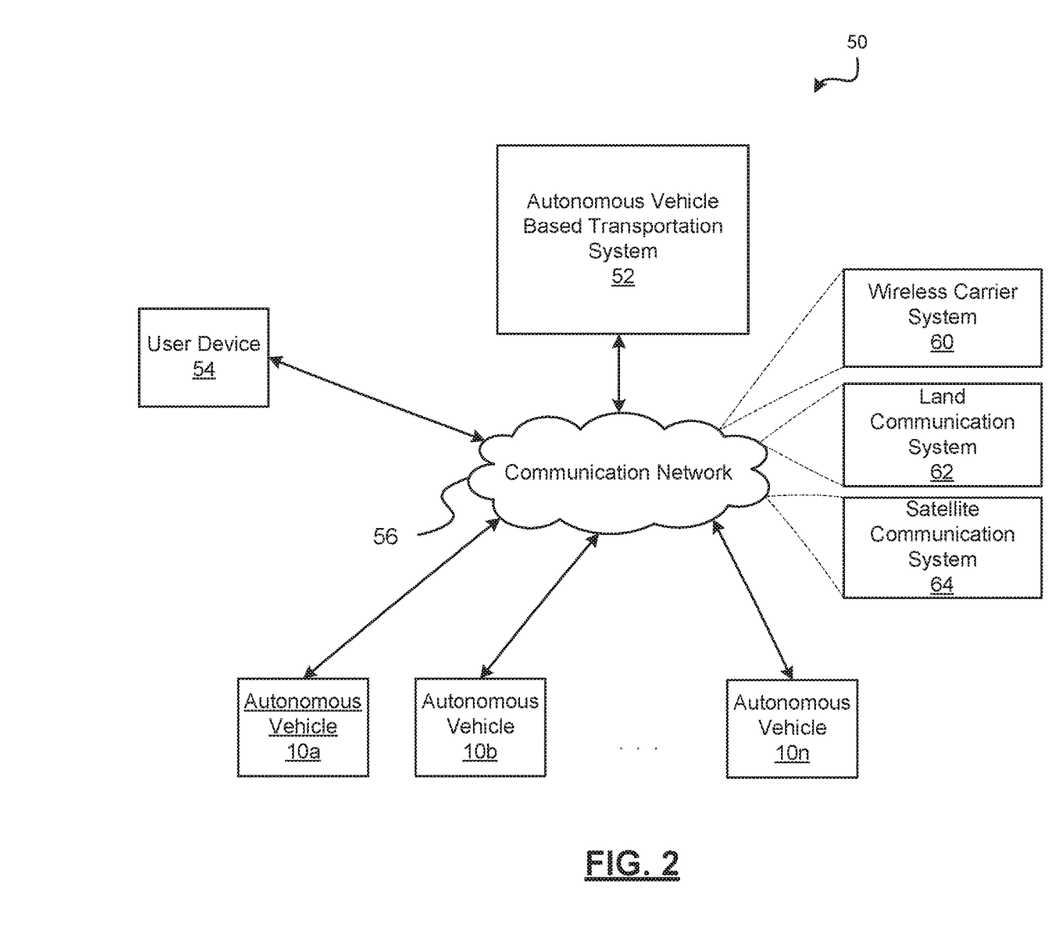
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10*a*-10*n*. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10*a*-10*n* to schedule rides, dispatch autonomous vehicles 10*a*-10*n*, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10*a*-10*n* (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
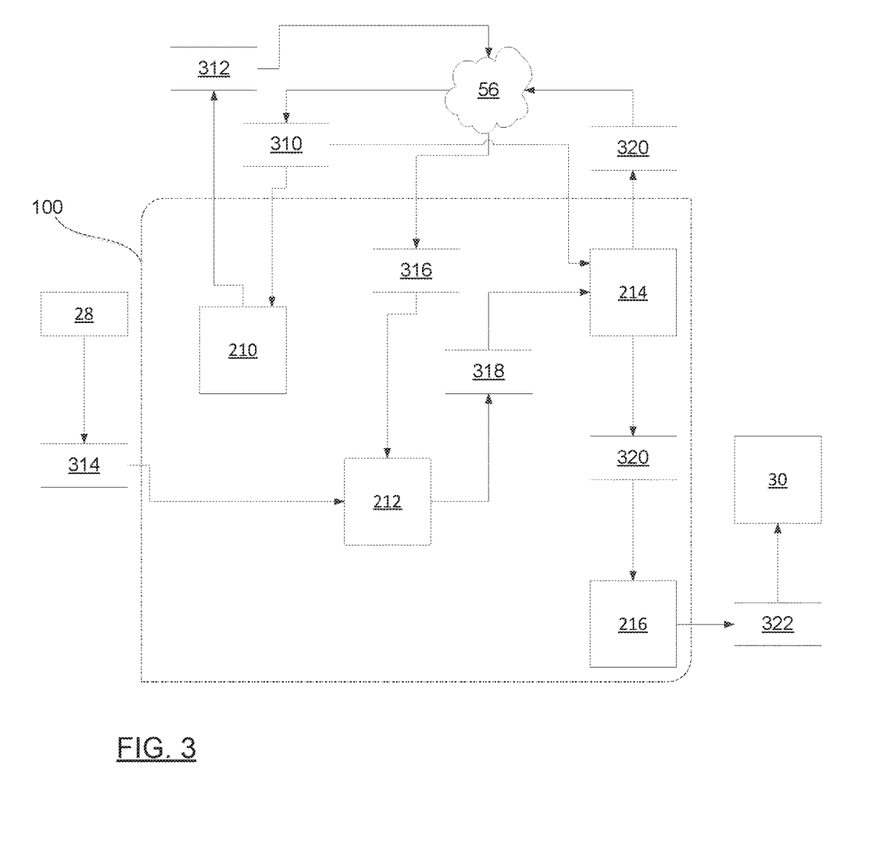
FIG. 3 is a dataflow diagram illustrating a control system of the autonomous vehicle, in accordance with various embodiments.

Referring now to FIG. 3, and with continued reference to FIG. 1, a dataflow diagram illustrates various embodiments of the control system 100 which may be embedded within the controller 34. Various embodiments of the control system 100 according to the present disclosure may include any number of sub-modules embedded within the controller 34. As can be appreciated, the sub-modules shown in FIG. 3 may be combined and/or further partitioned to similarly control the autonomous vehicle 10. Inputs to the control system 100 may be received from the sensor system 28, received from other control modules (not shown) associated with the autonomous vehicle 10, received from the communication network 56 at the communication system 36, and/or determined/modeled by other sub-modules (not shown) within the controller 34. In various embodiments, the control system 100 includes an initial friction coefficient module 210, an environmental data module 212, a coefficient adjustment module 214, and a vehicle control module 216.

The initial friction coefficient module 210 is configured to obtain a first value 310 of a friction coefficient for a road surface. The initial friction coefficient module 210 receives a first value 310 of a surface friction coefficient as input and transmits a vehicle location 312 as output. In some embodiments, the initial friction coefficient module 210 is configured to obtain the first value by retrieving the first value 310 from the communication network 56 based on the vehicle location. For example, initial friction coefficient module 210 may transmit Global Navigation Satellite System (GNSS) data as vehicle location 312 to the communication network 56 in order to indicate the vehicle location 312. Initial friction coefficient module 210 may then receive the first value 310 at the communication system 36 based on the vehicle location 312. In some embodiments, the initial friction coefficient module 210 retrieves a standard assumed friction coefficient as the first value 310 from a database (not shown) when no location specific friction coefficients are available from communication network 56.

The environmental data module 212 is configured to obtain environmental data at a location. In some embodiments, the environmental data module 212 is configured to obtain the environmental data at least in part by retrieving a weather report at the vehicle location using a communication network. In the example provided, the environmental data includes sensor data 314 from sensor system 28 and includes local weather report data 316 from communication network 56. For example, sensor data 314 may include data from visual and infrared spectrum cameras, LIDAR, and other sensors utilized in autonomous vehicles. As used herein, environmental data excludes steering angle slip data and self-aligning torque data utilized in typical reactive algorithms for adjusting a road surface friction coefficient.

In some embodiments, the environmental data module 212 is configured to obtain the environmental data at least in part by measuring an acceleration of a second vehicle using a sensor system at the first vehicle. For example, sensor data 314 may indicate accelerations of vehicles near autonomous vehicle 10 according to a "breadcrumbing" method. The latitudinal and longitudinal acceleration of a vehicle in the forward path of autonomous vehicle may be tracked in the breadcrumbing method and used as a minimum known acceleration magnitude. In some embodiments, the breadcrumbing method keeps a rolling count of maximum accelerations of the autonomous vehicle 10 and surrounding vehicles.

In some embodiments, local weather report data 316 includes temperature, precipitation, wind speed, wind direction, and other weather parameters based on the vehicle location 312. Local weather report data 316 may further include traffic reports and known problem roads in certain weather. The environmental data module 212 generates the environmental data 318 as output for use by the coefficient adjustment module 214.

The coefficient adjustment module 214 receives the first value 310 and the environmental data 318 as inputs and generates the second value 320 as an output. The coefficient adjustment module 214 is configured to calculate a second value of the friction coefficient based on the first value and based on the environmental data at the location. For example, the coefficient adjustment module 214 may use sensor system 28 to determine a road surface type and characterize surrounding vehicle behavior. Cameras of the sensor system 28 may identify the road surface type as, for example, gravel, wet asphalt, snow, ice, dry asphalt, mixed surface, or other surface types that are each associated with different surface friction coefficients, as will be appreciated by those with ordinary skill in the art.

In some embodiments, the coefficient adjustment module 214 is further configured to calculate the second value based at least in part on estimating a minimum road surface friction value using the acceleration of the second vehicle. For example, the coefficient adjustment module 214 may infer a minimum surface friction coefficient required to achieve the acceleration of the second vehicle.

In some embodiments, the coefficient adjustment module 214 is further configured to transmit the second value to a communication network that is external to the vehicle for a subsequent vehicle to use as the first value. For example, the coefficient adjustment module 214 may transmit the second value 320 to the communication network 56 using the communication system 36.

In some embodiments, messages on a communication bus of the autonomous vehicle 10 as indicated by the sensor data 314 are used to adjust the surface friction coefficient. For example, an Outside Ambient Temperature (OAT) sensor output may be utilized to discount or eliminate the possibility of certain surface coefficient values such as ice or snow in temperatures above freezing. In some embodiments, road surface temperatures and sun load may be measured or estimated for use in coefficient adjustment module 214. For example, infrared sensors of sensor system 28 may quantify the road surface temperature, which the coefficient adjustment module 214 may then use to calculate the second value. In some embodiments, the coefficient adjustment module 214 may use an output of a Tire Pressure Monitoring System (TPMS) of sensor system 28 to measure changes in tire pressure over a period of time to derive the surface temperature of the road surface.

In some embodiments, the coefficient adjustment module 214 may use the status of a windshield wiper system as indicated in the environmental data 318. For example, when the windshield wiper system is operating, then the coefficient adjustment module 214 may infer that it is raining and the road surface is wet. The coefficient adjustment module 214 may then reduce the first value to account for reduced friction on wet surfaces as part of calculating the second value. In some embodiments, the wiper system operation, the outside ambient temperature, and a visual spectrum camera output at least partially indicate the type of the road surface. In some embodiments, the coefficient adjustment module 214 may use an output from a humidity sensor to determine how damp the road surface may be in combination with the outside ambient temperature. For example, in damp and cold conditions, the coefficient adjustment module 214 may reduce the friction coefficient as part of calculating the second value when the humidity sensor and OAT sensor indicate it is cold and damp. In some embodiments, the coefficient adjustment module 214 may use the local weather report data 316 to derive traffic slowdowns based on the weather. In some embodiments, the coefficient adjustment module 214 is configured to adjust the first value according to the relationship: $\mu=a_1(OAT)+a_2(Windshield\ Wiper\ Duty\ Cycle)+a_3(humidity\ sensor\ output)+\ldots+a_n([sensor\ input])$, where $a_i$ are calibration values that may be linear, nonlinear, constant, and/or variable.

The vehicle control module 216 is configured to receive the second value 320 and to control the vehicle based on the second value. In the example provided, the vehicle control module 216 generates vehicle commands 322 as output for the actuator system 30 to use in controlling the autonomous vehicle 10. In some embodiments, the vehicle control module 216 is further configured to control the vehicle by planning a path for autonomous driving of the first vehicle based on the second value. Specific characteristics for path planning may be altered based on known performance metrics (e.g., tire is stronger in straight line in ice, etc.). For example, the vehicle control module 216 may actively adjust vehicle speed, acceleration targets, and alter the planned path (e.g., following distance, emergency maneuvers, etc.) to improve operation of the autonomous vehicle 10. In some embodiments, the vehicle control module 216 may adjust an emergency control system's target brake pressures and lateral capabilities proactively before wheel slip occurs. For non-autonomous applications, the vehicle control module 216 may warn the driver of possible hazardous road conditions, adjust chassis controls system targets, adjust anti-lock brake pressures, and the like as will be appreciated by those with ordinary skill in the art.

Figure 4:
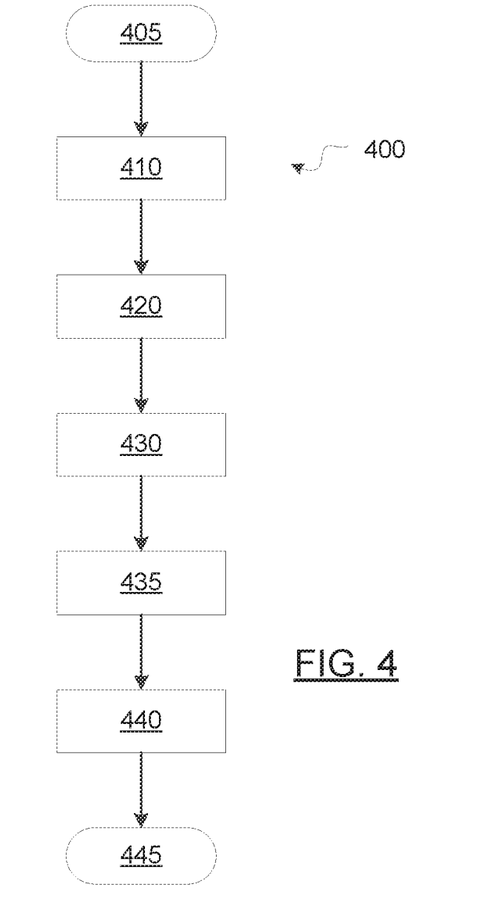
FIG. 4 is a flowchart illustrating a control method for controlling the autonomous vehicle, in accordance with various embodiments.

Referring now to FIG. 4, and with continued reference to FIGS. 1-3, a flowchart illustrates a control method 400 for determining road surface information that can be performed by the control system 100 of FIG. 3 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. In various embodiments, the method 400 can be scheduled to run based on one or more predetermined events, and/or can run continuously during operation of the autonomous vehicle 10.

In general, method 400 relates to a road surface friction coefficient (µ) algorithm that may approximate a surface friction coefficient in real-time. The algorithm may be utilized, for example, to actively control autonomous path planning or to adjust emergency control system targets to become a proactive system.

In various embodiments, the method may begin at 405. Control system 100 obtains a first value of a friction coefficient for a road surface at 410. For example, initial friction coefficient module 210 may obtain the first value from communication network 56 when other vehicles have transmitted friction coefficients at the vehicle location. In some embodiments, initial friction coefficient module 210 loads the first value from a database (not illustrated).

Control system 100 obtains environmental data at the vehicle location at 420. For example, the environmental data module 212 may obtain sensor data 314 from sensor system 28, such as OAT data, whether the wipers are on, humidity values, air intake temperature, infrared spectrum sensors, tire pressure monitoring system data, wind speed, GPS data, weather reports, bread crumbing algorithms for latitudinal and longitudinal accelerations of other vehicles, previous latitude and longitudinal accelerations of the current vehicle, and camera/LIDAR visuals for road surface type. Environmental data module 212 may further obtain local weather report data 316 to create environmental data 318.

Control system 100 calculates a second value of the friction coefficient based on the first value and based on the environmental data at the vehicle location at 430. For example, the coefficient adjustment module 214 may reduce the friction coefficient when the environmental data indicates the road surface has a low surface friction coefficient.

Control system 100 transmits the second value to a communication network that is external to the vehicle for a subsequent vehicle to use as the first value at 435. For example, the coefficient adjustment module 214 may transmit the second value 320 to the communication network 56 using the communication system 36.

Control system 100 controls the first vehicle based on the second value at 440. For example, the vehicle control module 216 may plan an autonomous driving path, actively optimize braking distances, adjust evasive maneuver capability, adjust vehicle speed, and proactively change chassis controls systems. For non-autonomous embodiments, the vehicle control module 216 may provide feedback to the driver based on potential hazardous road surfaces and may actively adjust chassis controls tuning more accurately, among other control. The method may end at 445.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of determining road surface information for a first vehicle at a vehicle location, the method comprising:
    obtaining a first value of a friction coefficient for a road surface;
    obtaining environmental data at the vehicle location, wherein obtaining environmental data includes measuring an acceleration of a second vehicle using a sensor system at the first vehicle;
    calculating a second value of the friction coefficient based on the first value and based on the environmental data at the vehicle location; and
    controlling the first vehicle based on the second value.

2. The method of claim 1, wherein calculating the second value includes estimating a minimum road surface friction value based on the acceleration of the second vehicle.

3. The method of claim 1, further comprising transmitting the second value to a communication network that is external to the first vehicle for a subsequent vehicle to use as the first value.

4. The method of claim 1, wherein controlling the first vehicle includes planning a path and controlling vehicle motion for autonomous driving.

5. The method of claim 1, wherein obtaining environmental data includes retrieving a weather report at the vehicle location using a communication network.

6. The method of claim 1, wherein obtaining the first value includes retrieving the first value from a communication network based on the vehicle location.

7. The method of claim 1, wherein obtaining environmental data includes measuring an outside ambient weather conditions.

8. The method of claim 1, wherein obtaining environmental data includes inferring whether precipitation is present based on a status of a windshield wiper system.

9. A system for controlling a vehicle, the system comprising:
    an initial friction coefficient module configured to obtain a first value of a friction coefficient for a road surface;
    an environmental data module configured to obtain environmental data at a location, wherein the environmental data module is configured to obtain the environmental data at least in part by measuring an acceleration of a second vehicle using a sensor system at the vehicle; and
    a coefficient adjustment module configured to calculate a second value of the friction coefficient based on the first value and based on the environmental data at the location.

10. The system of claim 9, further comprising a vehicle control module configured to control the vehicle based on the second value.

11. The system of claim 10, wherein the vehicle control module is further configured to control the vehicle by planning a path and controlling vehicle motion for autonomous driving of the vehicle based on the second value.

12. The system of claim 9, wherein the coefficient adjustment module is further configured to calculate the second value based at least in part on estimating a minimum road surface friction value using the acceleration of the second vehicle.

13. The system of claim 9, wherein the coefficient adjustment module is further configured to transmit the second value to a communication network that is external to the vehicle for a subsequent vehicle to use as the first value.

14. The system of claim 9, wherein the environmental data module is configured to obtain the environmental data at least in part by retrieving a weather report at the location using a communication network.

15. The system of claim 9, wherein the initial friction coefficient module is configured to obtain the first value by retrieving the first value from a communication network based on the location.

16. An autonomous vehicle, comprising:
a sensor system configured to collect environmental data external to the autonomous vehicle; and
a control system comprising:
an initial friction coefficient module configured to obtain a first value of a friction coefficient for a road surface;
a coefficient adjustment module configured to calculate a second value of the friction coefficient based on the first value and based on the environmental data, wherein the coefficient adjustment module is further configured to calculate the second value based at least in part on estimating a minimum road surface friction value using an acceleration of a second vehicle; and
a vehicle control module configured to control the autonomous vehicle by planning a path for autonomous driving of the autonomous vehicle based on the second value.

17. The autonomous vehicle of claim 16, wherein the coefficient adjustment module is further configured to transmit the second value to a communication network that is external to the autonomous vehicle for a subsequent vehicle to use as the first value.

\* \* \* \* \*